No. 687,482. Patented Nov. 26, 1901.
W. G. LENDERSON.
PORTABLE SEAT FOR VEHICLES.
(Application filed Mar. 8, 1901.)
(No Model.)
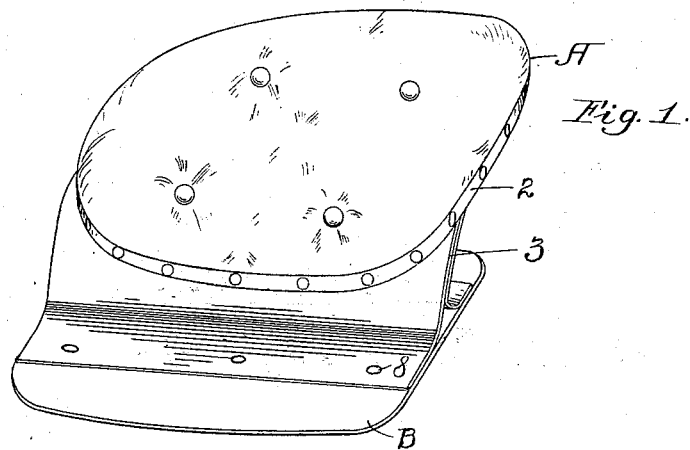
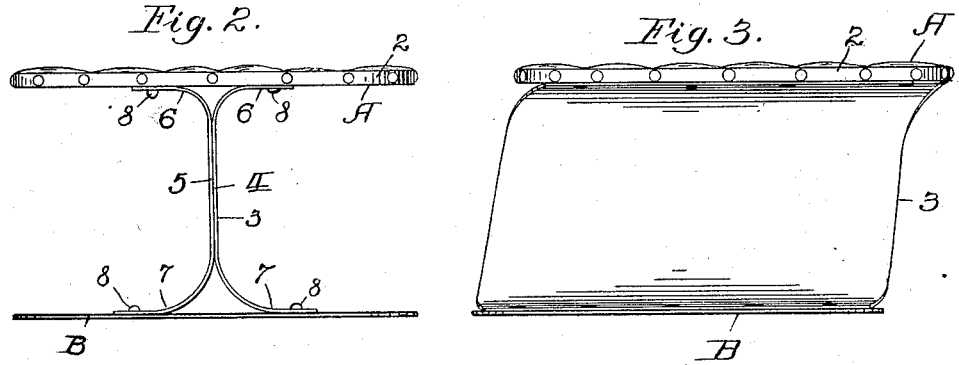
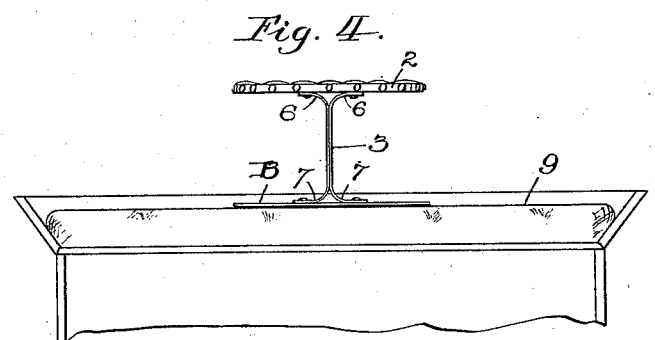
Witnesses:
L. E. Wickman
H. L. Thauwald
Inventor:
Wallace G. Lenderson.
by Stryker & Bradbury
Attorneys

UNITED STATES PATENT OFFICE.

WALLACE G. LENDERSON, OF ST. PAUL, MINNESOTA.

PORTABLE SEAT FOR VEHICLES.

SPECIFICATION forming part of Letters Patent No. 687,482, dated November 26, 1901.

Application filed March 8, 1901. Serial No. 50,317. (No model.)

*To all whom it may concern:*

Be it known that I, WALLACE G. LENDERSON, a citizen of the United States, residing at St. Paul, in the county of Ramsey and State of Minnesota, have invented certain new and useful Improvements in Portable Seats for Vehicles, of which the following is a specification.

My invention relates to improvements in portable seats for vehicles.

The object is to produce a portable seat which is stronger, more durable, and cheaper to construct than heretofore.

In the accompanying drawings, forming part of this specification, Figure 1 is a perspective view of my improved portable seat. Fig. 2 is a front elevation thereof. Fig. 3 is a side elevation of Fig. 2, and Fig. 4 is a front elevation of the portable seat shown in position upon the stationary seat of the vehicle.

In the drawings let A represent my improved portable seat, which consists of the horizontal seat-plate 2 and the broad base-plate B. The seat-plate 2 is supported upon the base-plate by the thin vertical flange 3. This flange consists of two sections 4 and 5, which are brazed or otherwise fastened together. The ends of the flange are curved or flared outward at 6 and 7. The seat-plate and base are fastened to these bifurcations, as shown in Fig. 2, by the rivets 8 or other suitable means. I preferably construct the framework of thin sheet metal; but it is obvious any suitable material may be used.

In use the portable seat is placed between the persons occupying the permanent seat of the vehicle. As shown in Fig. 4, it rests upon the cushion.

Among the features which differentiate my invention from seats heretofore produced are the sections 4 and 5, which are curved at 6 and 7 to fasten the seat-plate and base. These sections form a smooth side to the stationary seat and with the curved ends present a more comfortable contact with the users on either side as compared with sharp edges or corners as heretofore constructed.

Having described my invention, what I claim as new, and desire to protect by Letters Patent, is—

An auxiliary seat for vehicles, consisting of a seat-plate, a broad base for resting upon the seat of the vehicle, and a pair of thin plates fastened together to form a vertical flange and having their top and bottom ends curved to the horizontal; said upper ends being attached to the seat-plate and the lower ends to the base.

In testimony whereof I have signed my name to this specification in the presence of two subscribing witnesses.

WALLACE G. LENDERSON.

Witnesses:
  L. E. WICKMAN,
  F. G. BRADBURY.